Feb. 28, 1961   A. R. GRAD   2,973,012
SURGE VALVE
Filed Sept. 15, 1958

ADOLF R. GRAD
INVENTOR

T. Lloyd LaFave
ATTORNEY

United States Patent Office 2,973,012
Patented Feb. 28, 1961

2,973,012
SURGE VALVE

Adolf R. Grad, Milwaukee, Wis., assignor to The Oilgear Company, Milwaukee, Wis., a corporation of Wisconsin Filed Sept. 15, 1958, Ser. No. 761,000

11 Claims. (Cl. 137—620)

This invention relates to a reciprocating type valve and more particularly to such a valve operable at high pressures with a minimum of leakage along the plunger to a closed valve port.

Reciprocating type valves have advantages over poppet type valves for use as surge and prefill valves for a working cylinder of a hydraulic press in that they contribute to noiseless and shockfree operation without the necessary addition of extra valves and accessories required when using poppet type valves. The reciprocating surge type valve is particularly suited for hydraulic press applications such as extruding, forging, hot plate pressing, molding and casting, which require the application of high tonnage forces for shock free decompression of the working cylinder.

The present valve is adapted for use as a surge valve for the working cylinder of a hydraulic press, and has one port adapted to be connected to the cylinder for receiving fluid under pressure from a chamber in the valve. Another port is operatively closed to the chamber by a plunger along which fluid leakage or slip occurs when the fluid must be maintained at relatively high pressures, of the order of 5000 p.s.i. Fluid leakage or slip must be made up by the pump supplying liquid to the valve and in reciprocating type surge valves as heretofore made the additional horsepower required to make up such leakage or slip has been considered excessive.

According to the present invention a reciprocating type valve is provided which obviates the above disadvantages and adapts the valves for use as a surge valve with a predetermined minimum slip at operating pressure and is adaptable for fast and smooth decompression of a working cylinder of a hydraulic press.

It is therefore an object of the present invention to construct a surge valve of the reciprocating type for any predetermined minimum leakage at the operating pressure.

Another object of the invention is that such surge valve improve the noiseless and shockfree decompression ability thereof.

Another object of the invention is to provide a reciprocating type directional valve having a low pressure port closed by a plunger constructed and arranged to maintain a predetermined minimum leakage to the low pressure port.

Another object of the invention is to provide a reciprocating type surge valve that maintains a constant rate of leakage for different operating pressures.

Another object of the invention is to provide a reciprocating type surge valve having a cooperating sleeve and plunger that maintain a constant clearance therebetween for different operating pressures.

Another object of the invention is to provide a reciprocating type surge valve having leakage limiting means operable independently of deflections in the valve body for different operating pressures.

Another object of the invention is to provide a reciprocating type surge valve with minimum leakage at operating pressure and a plunger readily movable with a small operating force.

Another object of the invention is to provide a surge valve of the reciprocating plunger type with plunger and plunger receiving element fitted to a predetermined tolerance and having parts easily removable for adjustment for increasing or decreasing the leakage between the plunger and plunger receiving element at operating pressure without disturbing the initial tolerance therebetween.

Other objects and advantages of the present invention will be apparent upon a reading of the following description taken with the accompanying drawings in which.

Figure 1:
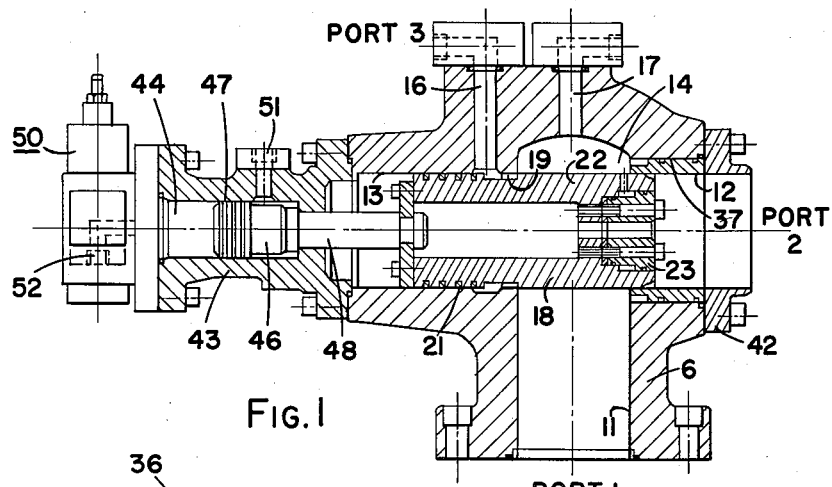
Fig. 1 is a cross sectional view in elevation of a reciprocating plunger type surge valve embodying the present invention.

Referring to the drawings, the reciprocating type valve shown in Fig. 1 is a directional valve adapted for use particularly as a surge valve for a hydraulic press, not shown. The surge valve comprises a valve body 6 having primary ports 1, 2 and 3. Port 1 is formed by a bore 11 and port 2 is formed by a bore 12 that has a portion 13 on the left side of a fluid pressure chamber 14 formed by the intersection of bores 11 and 12 which are disposed transversely of each other.

Port 3 is a fluid inlet port adapted for connection to a source of fluid pressure such as a hydraulic pump, and port 3 is connected by an inlet passage 16 open to bore 13 on the left side of pressure chamber 14.

Port 1 is adapted for connection to a working cylinder of the hydraulic press, and, port 2 is adapted for connection of a surge tank or a prefill tank for the working cylinder, not shown. A passage 17 extending from chamber 14 to the top of the valve body forms a port for connection to an auxiliary device such as a pressure indicating gage, or to an auxiliary valve for aiding in decompressing the fluid in the working cylinder.

A reciprocable valve member is disposed in bore 13 for selectively opening the port 3 while closing the port 2, or vice versa, opening the port 2 while closing port 3 to the valve chamber 14.

The reciprocable valve member comprises an operating plunger 18 shown disposed toward port 2 for opening port 3 to chamber 14 and closing port 2 thereto. The plunger 18 has an annular groove 19 positioned therein so as to overlap the wall of bore 13 between inlet passage 16 and chamber 14 when the plunger is positioned as shown, for operatively connecting the working cylinder of a hydraulic press to the source of pressure fluid. A plurality of oil or piston type rings 21 mounted on the left end of the plunger provide sealing engagement with the wall of bore 13 to prevent escape of pressure fluid along the plunger away from chamber 14.

Figure 2:
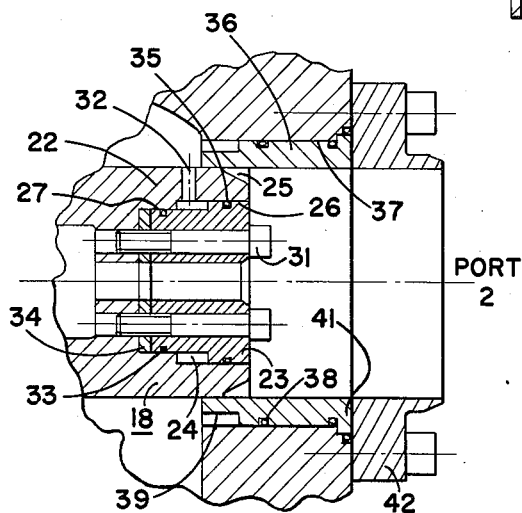
Fig. 2 is an enlarged view in cross section showing the end portion of the operating plunger of Fig. 1.

The free end 22 or right end portion of plunger 18, Figs. 1 and 2, extends into the valve chamber 14 and is movable into and out of the portion of bore 12 on the right side of the chamber 13 so as to respectively operatively close or open port 2 to chamber 14. Since the free end 22 of the plunger moves entirely out of the bore 12, sealing means different from the oil rings 21 are employed to prevent excessive leakage along the plunger from chamber 14 to port 2 when the plunger is positioned as shown to block port 2.

The free end 22 of plunger 18 may be tubular and have a ring or plug 23 disposed therein constructed to form an annular space 24 between the radially outer wall of the ring 23 and the radially inner wall of the tubular end 22 of the plunger. As shown, the end 22 of the plunger has an axial bore 27 and a counterbore 26 which form a shoulder therebetween. Ring 23 is correspondingly shaped and has stepped outer diameters which form a shoulder therebetween. The ring 23 is suitably secured in the end of the plunger by screws 31. Shoulders of the plug and counterbore are axially spaced from one another and define the annular space 24 therebetween which lies radially within adjacent portions of chamber 14 and bore 12, with the plunger in a position closing port 2, as shown. A passage 32 in the end portion of plunger 18 connects annular space 24 with the chamber 14, so that the pressure in chamber 14 tending to constrict the free end of the plunger is opposed by fluid at the same pressure admitted to the annular space 24.

Suitable sealing means such as O-ring packings 33 and 35 are mounted in the faces of the adjacent walls of the plunger and of the removable ring 23 on opposite sides of the annular space 24 to provide a sealing engagement therebetween so that relative changes in the configuration of the plunger and of the ring 23 due to the fluid pressures therebetween is insufficient to materially change the effectiveness of this sealing means 33. The low pressure side of the packings 33 is at the pressure of fluid in port 2. A spacer 34 of selected thickness is disposed in the bottom of bore 26 to provide a predetermined axial length to the annular space 24 and to the spacing between the packings 33 and 35. The axial length of space 24 may be varied by machining an end of plug 23 or by replacing the spacer 34 with another of different thickness. The annular space 24 may be designed to underlie the cooperating surfaces of the plunger and the bore 12 so that the net radial forces on this free end portion of the plunger tends to expand the plunger and maintain a sealing engagement with the wall of bore 12. Adjustment of the space by replacing the spacer with another of different size effects the sealing engagement of the plunger with bore 12 without changing their initial tolerance.

A sleeve 36 is removably secured in an oversize bore 37 in the valve body 6 and has an internal diameter the same as bore 12 to make a predetermined fit with the free end of the plunger. Suitable sealing means such as O-ring packings 38 are disposed between the radially outer wall of the sleeve 36 and the bore 37 to prevent fluid flow between the wall of bore 37 and the sleeve 36, and to limit the axial length of the sleeve subject to pressure of fluid within the chamber to a fixed amount so that the sleeve 36 and the free end of the plunger cooperate to provide and maintain their clearance independently of changes in the diameter of bore 37 due to changing stresses on the valve body.

The sleeve 36 and free end of the plunger are machined for a predetermined fit or tolerance permitting free movement of the plunger in the sleeve, having a tolerance for example of 0.0033 inch, which is a relatively loose or sliding fit. Such fit normally would permit excessive leakage of fluid or slip that also would result in an appreciable pressure drop therealong so that the opposing radial force within the annular space 24 tending to expand the plunger is at least substantially equal to the radial forces tending to constrict the corresponding free end of the plunger.

Sleeve 36, moreover, has a leading end 39, relative to receiving movement of the plunger therein, that is spaced from the wall of the bore 37 in the valve body so that this leading end of the sleeve is subject to net radial forces due to the pressure of fluid in chamber 14 that tends to constrict the sleeve 36 about the plunger.

Sleeve 36 has a flanged end 41 abutting a shoulder in the valve body and is secured in position by an end head 42 bolted to the valve body in abutting relationship to the sleeve 36. The end head 42 has a bore the same diameter as the bore 12 in the sleeve and is aligned therewith and defines the second port 2 of the surge valve, also referred to as the low pressure port.

In operation, the valve plunger in the position shown in Figs. 1 and 2, closes port 2 and connects port 1 with port 3. Chamber 14 is supplied with fluid under pressure necessary to operate the working cylinder of the hydraulic press or to hold the press ram in a given position. For decompression to avoid hydraulic shock to the system, the operating plunger is moved to the left to close port 3 to the chamber and to gradually open port 2 thereto. The leading end of the plunger 22 has one or more tapered axial slots 25 in its outer periphery that gradually connect port 2 with the pressure chamber before the leading end of the plunger is fully withdrawn from the bore 12.

Figure 4:
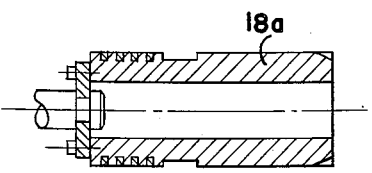
Fig. 4 is a modification of the plunger and plunger receiving sleeve arrangement of Fig. 1.

Since the deflection of the leading end portion of the sleeve which is preferably made of hardened ground steel, is determined by the ratio of its outer and inner diameters and by the modulus of elasticity, such diameters may be chosen, within the proportional limit for the material, so that the sleeve will deform a predetermined amount at a given operating pressure for the valve. The sleeve structure is considered in combination with a plunger 18a having a tubular leading end and an internal diameter chosen so that the plunger 18a deforms as much as the sleeve, then the initial tolerance between the two is maintained for any operating pressure, as provided by the arrangement shown in Fig. 4, where plunger 18a is used in lieu of plunger 18 in Fig. 1. Plunger 18a, unlike plunger 18, does not employ a plug or ring 23. Plunger 18a remains hollow at its free end which is adapted to close port 2 to the valve chamber 14. When port 2 is closed by plunger 18a, the fluid pressure in valve chamber 14 deforms plunger 18a radially inwardly, and such pressure also deforms the lip 39 of sleeve 36 radially inwardly, as hereinafter further described.

Providing means opposing deformation of the leading end of the plunger 18, as shown in Fig. 2 and deforming the sleeve 36 a predetermined amount at the operating pressure permits selecting the amount of leakage between the plunger and sleeve from zero leakage to an acceptable minimum leakage.

Figure 5:
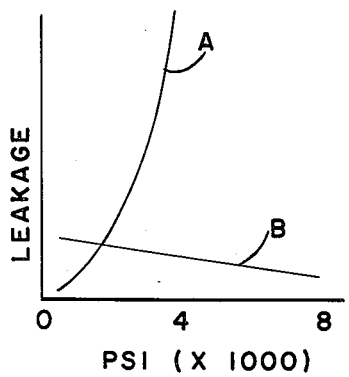
Fig. 5 is a graph showing the leakage or slip characteristics of a surge valve made according to the present invention and showing the slip characteristic of a surge valve as heretofore constructed.

The initial tolerance between the plunger and its receiving member or sleeve may therefore be substantially increased and still obtain a predetermined minimum and acceptable leakage at an operating pressure for example of 5000 pounds per square inch, as illustrated by the leakage characteristics shown by the curves of Fig. 5, in which plunger 18 and a receiving member had an initial clearance of 0.0012, curve A, and an initial clearance of 0.0033, curve B and the latter example employed a deformable sleeve 36 as described herein.

A predetermined minimum leakage or a positive seal may also be obtained between sleeve 36 and plunger 18a at a given operating pressure. The amount of deformation of plunger 18a radially inward at such pressure at the leading edge or lip 39 of the sleeve can be made to equal the inward deformation of the lip 39 so that the initial tolerance therbetween is maintained. The deformation of the plunger 18a and the lip 39 can also be made to differ slightly at a given pressure so that the tolerance is decreased with increase in operating pressure and effect a positive seal or a leakage characteristic as indicated by curve B, Fig. 5.

If the materials of sleeve lip 39 and plunger 18a are the same or have the same modulus of elasticity, then their deformations under pressure is determined by their relative thickness and diameters. If the materials of lip 39 and plunger 18a are not the same or do not have the same modulus of elasticity, then their relative deformations under a predetermined operating pressure is determined in a similar manner modified by the factors of their different moduli of elasticity.

Operating plunger 18 is actuated by a control cylinder 43 having piston 46 provided with piston rings 47 so that the control cylinder serves as a dashpot. A rod 48 connects the piston 46 to the operating plunger of the surge valve. Ports 51, 52 at opposite ends of the control cylinder may be connected through suitable valve means to fluid pressure and exhaust, selectively.

Figure 3:
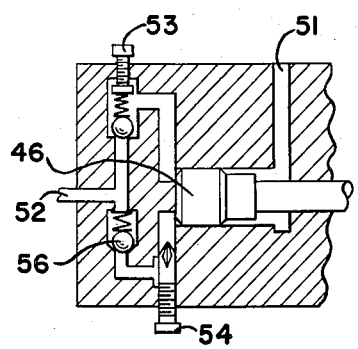
Fig. 3 is a schematic illustration of the integral control mechanism for the operating plunger of Fig. 1.

As shown in Fig. 1 such valve means comprises an operator assembly 50 mounted on the end of the control cylinder and as schematically illustrated in Fig. 3 comprises a port 52 for supplying fluid through a resistance valve 53 to the dashpot end 44 of the control cylinder for moving control piston 46 to the right and a choke valve 54 in series with a check valve 56 to port 52 for exhausting fluid from the dashpot when fluid is admitted to a control port 51 for moving control piston 46 to the left.

Ports 51, 52 may be connected to opposite ports of a reversible pump that supplies fluid to the press cylinder, with port 52 suitably connected to the same pump port as port 3 of the valve, and a predetermined pump pressure operates the resistance valve to actuate the control piston and move plunger 18 to close the port 2 to the prefill tank and open port 3 to the press cylinder. When retracting the press ram, control port 51 is connected to pressure fluid and control port 52 to exhaust, as by reversing the pump, and the control piston is thereby moved to the left, gradually because the rate of fluid flow from the dashpot is restricted by the adjustable metering action of the choke valve 54. Since the operating plunger is therefore gradually leaving bore 12 and has tapering slots 25 in its outer periphery, the high pressure present in the press cylinder is gradually reduced without excessive shock to the system.

Although but a few embodiments of the present invention have been shown and described, it may be obvious to one skilled in the art that changes may be made therein that are within the spirit of the invention and the scope of the claims.

I claim:

1. In a valve adapted for use as a surge valve for a hydraulic press, a valve body having a fluid pressure receiving chamber, a first port open to said chamber, a bore defining a second port open to said chamber at one side thereof, an inlet port open to said bore adjacent the other side of said chamber for supplying high pressure fluid thereto, a substantially rigid sleeve secured in sealing engagement with a wall of said bore adjacent said second port, a leading end portion of said sleeve being spaced from said wall of said bore, a plunger reciprocable in said bore for opening and closing said inlet port to said chamber and having an end portion movable into said leading end portion of said sleeve for closing said second port to said chamber when said first port is open to said chamber, and said leading end portion of said sleeve deforming under operating pressure to a substantially fluid tight engagement with said plunger.

2. In a valve adapted for use as a surge valve for a hydraulic press, a valve body having a fluid pressure receiving chamber, a first port open to said chamber, a bore defining a second port open to said chamber at one side thereof, an inlet port open to said bore adjacent the other side of said chamber for supplying high pressure fluid thereto, a substantially rigid sleeve secured in sealing engagement with a wall of said bore adjacent said second port, a leading end portion of said sleeve being spaced from said wall of said bore, a plunger reciprocable in said bore for opening and closing said inlet port to said chamber and having an end portion movable into said leading end portion of said sleeve for closing said second port to said chamber when said first port is open to said chamber, said leading end portion of said sleeve constructed and arranged to normally provide a sliding fit with said plunger, means positioning said plunger in said sleeve, whereby fluid under operating pressure admitted to said chamber thereby causes said leading end portion of said sleeve to deflect a predetermined amount and provide a sealing fit between said leading end portions of said sleeve and plunger.

3. In a valve adapted for use as a surge valve for a hydraulic press, a valve body having a fluid pressure receiving chamber, a first port open to said chamber, a bore defining a second port open to said chamber at one side thereof, an inlet port open to said bore adjacent the other side of said chamber for supplying high pressure fluid thereto, a substantially rigid sleeve secured in sealing engagement with a wall of said bore adjacent said second port, a leading end portion of said sleeve being spaced from said wall of said bore, a plunger reciprocable in said bore for opening and closing said inlet port to said chamber and having an end portion movable into said leading end portion of said sleeve for closing said second port to said chamber when said first port is open to said chamber, said end portion of said plunger being tubular, a ring disposed in sealing engagement within said end portion of said plunger and constructed and arranged to form an annular enclosed space therebetween, and passage means connecting said annular space with said chamber to admit pressure fluid thereto for opposing deformation of said end portion of said plunger.

4. In a valve adapted for use as a surge valve for a hydraulic press, a valve body having a fluid pressure receiving chamber, a first port open to said chamber, a bore defining a second port open to said chamber at one side thereof, an inlet port open to said bore adjacent the other side of said chamber for supplying high pressure fluid thereto, a substantially rigid sleeve secured in sealing engagement with a wall of said bore adjacent said second port, a leading end portion of said sleeve being spaced from said wall of said bore, a plunger reciprocable in said bore for opening and closing said inlet port to said chamber and having an end portion movable into said leading end portion of said sleeve for closing said second port to said chamber when said first port is open to said chamber, said end portion of said plunger having an axial bore and a counterbore formed therein, a stepped cylindrical plug detachably fitted in sealing engagement with the walls of said bore and counterbore and defining an enclosed annular space between the walls of the counterbore and said plug, a passage in said end portion of said plunger open to said annular space and to said chamber so that fluid under pressure in said chamber is admitted to said annular space to oppose constriction of said end portion of said plunger radially adjacent said end portion of said sleeve which is urged radially inward in sealing engagement with said plunger by the operating pressure in said chamber when the plunger moves into the leading end portion of the sleeve.

5. In a valve adapted for use as a surge valve for a hydraulic press, a valve body having a fluid pressure receiving chamber, a first port open to said chamber, a bore defining a second port open to said chamber at one side thereof, an inlet port open to said bore adjacent the other side of said chamber for supplying high pressure fluid thereto, a substantially rigid sleeve secured in sealing engagement with a wall of said bore adjacent said second port, a leading end portion of said sleeve being spaced from said wall of said bore, a plunger reciprocable in said bore for opening and closing said inlet port to said chamber and having an end portion movable into said leading end portion of said sleeve for closing said second port to said chamber when said first port is open to said chamber, said end portion of said plunger being tubular and open to said second port, and the thickness of the wall of the leading end of said sleeve and the thickness of the wall of said end portion of said plunger being proportioned relative to their moduli of elasticity so that the tolerance of said sealing engagement of said sleeve and said plunger remains substantially constant for different operating pressures.

6. A reciprocating type valve having a chamber, means supplying fluid under pressure to said chamber, a first port open to said chamber, a plunger, a bore receiving said plunger and defining a second port open to said chamber, a sleeve disposed in said bore adjacent to said second port, said plunger having a tubular end portion movable into said sleeve in sealing engagement therewith to close said second port to said chamber, a lip of said sleeve at its leading end relative to said plunger being spaced from the wall of said bore so that fluid pressure in said chamber bends said lip and said end portion of said plunger radially inwardly when said second port is closed by said plunger, the thickness of said lip and the thickness of said tubular end portion of said plunger being proportioned relative to their respective moduli of elasticity so that their unit radial deflections are substantially equal and their sealing engagement is maintained for operating pressure.

7. A valve adapted for use as a surge valve for a cylinder of a hydraulic press, a chamber in said valve open to a first port adapted for connection to the press cylinder, a plunger receiving bore in said valve defining a second port to said chamber and adapted for connection to a surge tank for said cylinder, a passage in said valve connecting said bore to a third port that is adapted for connection to a source of fluid pressure, an operating plunger disposed in said bore and reciprocable therein to positions closing either said second or third ports relative to said chamber, a substantially rigid metal sleeve disposed in said bore adjacent said second port and receiving an end portion of said plunger, a leading end portion of said sleeve relative to said plunger being spaced from the wall of said bore and constructed and arranged so that operating pressure in said chamber with said plunger in said sleeve causes said end portion of said sleeve to resiliently constrict about said plunger and provide a sealing engagement therewith.

8. In a reciprocating type surge valve for a hydraulic press, said valve including a chamber supplied with fluid under pressure and adapted for connection to a cylinder of the press, a plunger receiving bore adapted for connection to a surge tank for the cylinder, and a plunger extending through said chamber and movable into and out of said bore, and a sleeve disposed in sealing engagement with said bore and having a leading end portion receiving an end of said plunger for closing said bore to said chamber, said leading end portion of said sleeve having a radially outer periphery exposed to fluid pressures in said chamber so that said pressure acts radially thereon to hold said end of said sleeve in sealing engagement with said plunger.

9. A valve adapted for use as a surge valve for a high pressure hydraulic press, said valve having a chamber open to a first or load connecting port, a bore defining a second port open to said chamber on one side thereof, an inlet fluid pressure receiving port open to said bore on the other side of said chamber, a plunger disposed in said bore and reciprocable therein to operatively connect said inlet port with said chamber and having an end portion movable into the portion of said bore adjacent said second port for closing said second port to said chamber, said end portion of said plunger provided with an axial bore and counterbore and with a stepped diameter cylindrical plug disposed therein to define an axially extending annular space between a shoulder of said axial bore and counterbore and a shoulder of said stepped diameter plug, means connecting said annular space with said chamber, and means spacing said plug from the bottom of said axial bore in said plunger to thereby vary the axial length of said annular space.

10. In a valve adapted for use as a surge valve for a hydraulic press, a valve body having a fluid pressure receiving chamber, a first port open to said chamber, a bore defining a second port open to said chamber at one side thereof, an inlet port open to said bore adjacent the other side of said chamber for supplying high pressure fluid thereto, a plunger reciprocable in said bore for opening and closing said inlet port and having an end portion movable into and out of said bore on said one side of said chamber for closing and opening said second port, said end portion of said plunger being tubular and containing a plug co-operative therewith to define an axially extending annular recess between the radially inner wall of said plunger and the mating wall of said plug, said end portion of said plunger when disposed in said bore to close said second port has said annular recess in underlying relation to a juncture of said bore with said chamber, and passage means maintaining said annular recess in connection with said chamber so that fluid under pressure in said chamber tending to deform said plunger at said juncture is opposed by the opposing pressure of fluid admitted from said chamber to said annular recess.

11. A surge valve for a cylinder of a hydraulic press, said valve having a chamber open to a cylinder connecting port, a bore extending through said valve and defining a tank port at one end thereof adapted for connection to a surge tank for the cylinder, a sleeve disposed in sealing engagement with said bore adjacent said tank port and having an end portion subject to radial compression by pressures within said chamber, a plunger reciprocable in said bore and having an end portion movable into said sleeve for closing said tank port, a plunger bore in the end portion of said plunger, a plug disposed in said plunger bore, said plug and the wall of said plunger bore forming an axially extending annular space intermediate the ends of said plug, and a passage in said plunger connecting said annular space with said chamber, whereby fluid under pressure in said chamber prevents constriction of said plunger and causes constriction of said end portion of said sleeve to provide a sealing fit between said sleeve and said plunger at predetermined operating pressures when said tank port is closed by said plunger.

References Cited in the file of this patent

UNITED STATES PATENTS

| | | |
|---|---|---|
| 430,689 | Rigg | June 24, 1890 |
| 2,415,417 | Collins | Feb. 11, 1947 |
| 2,602,592 | Tomoser | July 8, 1952 |
| 2,638,122 | Ludwig | May 12, 1953 |

FOREIGN PATENTS

| | | |
|---|---|---|
| 629,321 | France | July 25, 1927 |

Disclaimer 2,973,012.—*Adolf R. Grad*, Milwaukee, Wis. SURGE VALVE. Patent dated Feb. 28, 1961. Disclaimer filed Oct. 3, 1963, by the inventor, the assignee, *The Oilgear Company*, assenting.
Hereby enters this disclaimer to claim 8 of said patent.
[*Official Gazette October 29, 1963.*]